INVENTOR.
JAMES W. ANGELL

Oct. 15, 1963          J. W. ANGELL          3,107,104

SPRING SUSPENSION FOR VEHICLES

Filed Sept. 14, 1960          3 Sheets-Sheet 2

INVENTOR.
JAMES W. ANGELL

BY his ATTORNEYS.

Oct. 15, 1963  J. W. ANGELL  3,107,104
SPRING SUSPENSION FOR VEHICLES
Filed Sept. 14, 1960  3 Sheets-Sheet 3
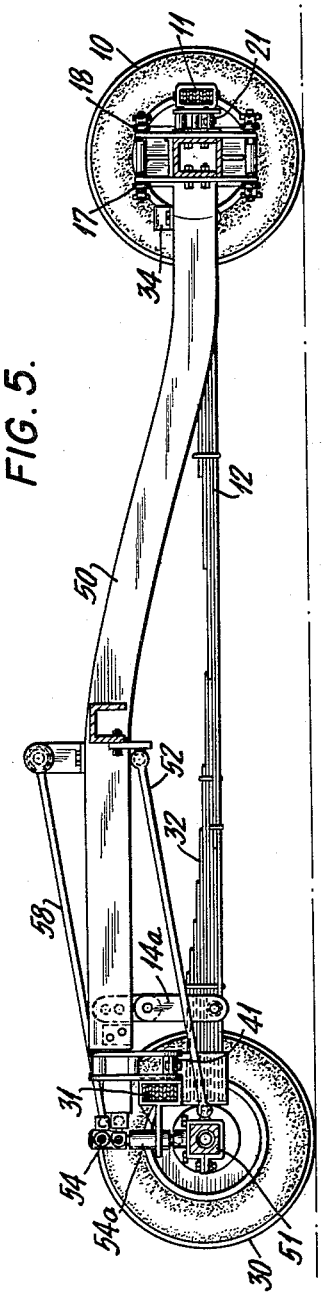
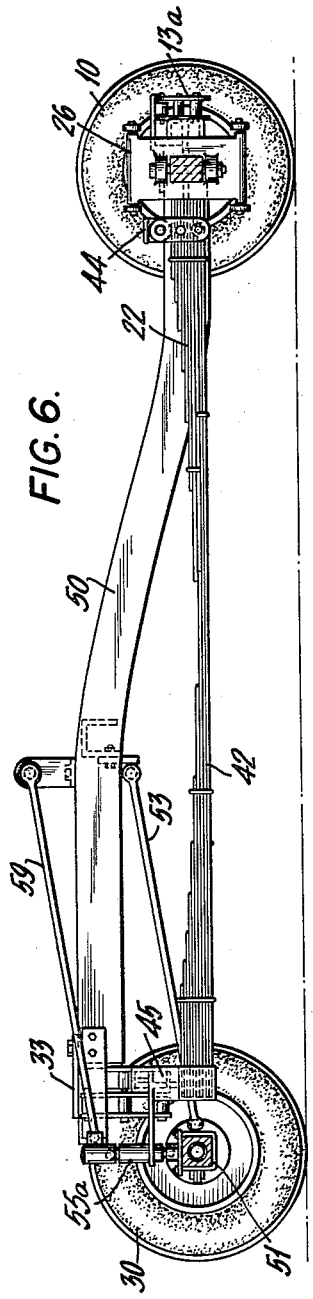
INVENTOR.
JAMES W. ANGELL
BY
his ATTORNEYS.

United States Patent Office 3,107,104
Patented Oct. 15, 1963

3,107,104
SPRING SUSPENSION FOR VEHICLES
James W. Angell, 1136 5th Ave., New York 28, N.Y.
Filed Sept. 14, 1960, Ser. No. 55,913
9 Claims. (Cl. 280—124)

The present invention relates to an improved spring suspension for vehicles which supports the chassis for movement with a minimum of angular orientation as the vehicle travels over irregular terrain.

In conventional four-wheeled vehicles the chassis is supported from the wheels by springs connecting the axle or the axle-housing of the wheel to the respective corner of the chassis. Consequently, when the wheels of the moving vehicle hit a bump or depression, the springs are deformed, imparting a vertical motion to the chassis. If only one wheel hits the bump or depression, the chassis has imparted to it an additional tilting or rolling motion with which automobile riders are so familiar.

It is an object of the present invention to provide a spring suspension which maintains the horizontal stability of the chassis over bumpy road surfaces by eliminating pitching and rolling motions. Another object is to provide a suspension device which results in a substantial reduction of vertical movements of the chassis. Still another object of the invention is to provide a novel suspension system for a vehicle. A still further object of the present invention is to provide a spring suspension which eliminates virtually all side-sway and outward tilting of the chassis on curves.

In accordance with the present invention the chassis of the moving vehicle is maintained in a horizontal plane despite road bumps or depressions by the provision of means which transmits vertical road shock forces affecting any one wheel to two diagonally opposite corners of the chassis substantially equally. By transmitting the vertical road shock forces to two diagonally opposite corners, the resultant of these forces passes approximately through the center of gravity of the vehicle and, thus, the chassis as a whole moves vertically without tilting in any direction.

Other features of the present invention include provision for supporting the chassis from the spring suspension by the use of movable connections and provision for mounting the wheels to the chassis for movement in a vertical plane (or, stated another way, in a plane perpendicular to the plane of the chassis), both features contributing to the elimination of forces which tend to impart angular orientation to the chassis from a horizontal plane.

The actual upward movement of each of the two corners of the chassis, which results from hitting a bump, is substantially less than the upward movement of a single corner of the chassis when the adjacent wheel hits a bump with conventional spring arrangements. This is due to the fact that as the chassis moves upward the tension of all of the other springs is relaxed, and the two springs originally affected thus carry an increased fraction of the total weight of the chassis.

The opposite relations and forces come into play when a single wheel hits depressions in the road. If two or more wheels hit a bump or depression simultaneously, the aggregate of the forces are more complicated, but the same principles apply. In all cases, assuming proper spring design and chassis loading, the chassis will rise or fall vertically without rocking or swaying when the vehicle encounters bumps or depressions.

The invention will be further explained with reference to the accompanying drawings in which.

Figure 1:
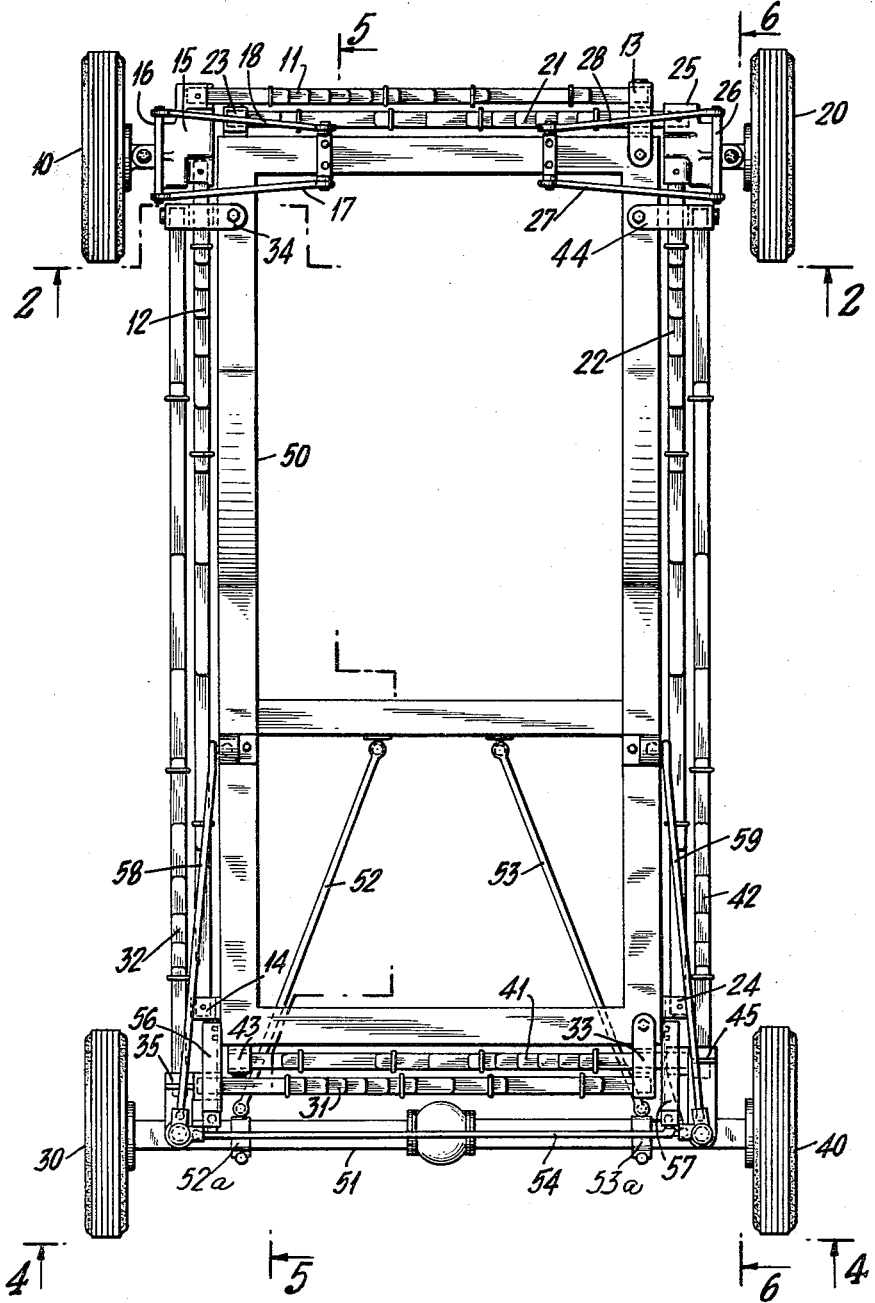
FIGURE 1 is a schematic plan view of the spring suspension of the present invention.

FIGURES 5 and 6 are cross-sectional side elevations taken along the lines 5—5 and 6—6 of FIGURE 1, respectively.

Referring to FIGURE 1 of the drawings, the spring suspension of the present invention is shown supporting a chassis 50 of a vehicle. In the spring suspension of the present invention, vertical road shocks are transmitted from each wheel through springs to diagonally opposite corners of the chassis. More specifically, the left front wheel 10 is attached to the right front corner of the chassis 50 by a lateral spring 11 and to the left rear corner of the chassis by a longitudinal spring 12. Similarly, right front wheel 20, left rear wheel 30, and right rear wheel 40 are attached by springs 21 and 22, 31 and 32, and 41 and 42, respectively to diagonally opposite corners. The ends of the springs 11 and 12 remote from the front wheel 10 are connected to the chassis through pivotal links 13a and 14a (see FIGURES 5 and 6), respectively. The links 13a and 14a are suspended from supports 13 and 14, respectively, which are attached to the chassis. These connections between the springs and the chassis tend to eliminate shocks in a generally horizontal plane, which would otherwise be transmitted directly through the springs to the chassis. The opposite ends of the springs 11 and 12 are rigidly connected directly to a wheel spring support 15. The ends of the springs 21 and 22, 31 and 32, and 41 and 42 remote from the wheels are connected in similar fashion to the chassis by pivotal links suspended from supports 23 and 24, 33 and 34, and 43 and 44, respectively, all shown in FIGURE 1. The opposite ends of these springs are rigidly connected to the wheels 20, 30 and 40, respectively, by the wheel spring supports 25, 35 and 45, respectively.

In the drawings, the springs are shown as of the flat leaf type, although obviously other types of resilient means could be employed. Also, the lateral springs 31 and 41 for the wheels 30 and 40 have been shown to be lying in front of the rear axle 51. It is to be understood, of course, that in accordance with design or assembly requirements, they may be placed either in front of, behind, or directly over the rear axle.

It should be noted that each wheel is connected by two springs (or two sets of springs) and other auxiliary devices to the roughly rectangular chassis 50 at or near two corners of the chassis, i.e., at or near both the laterally opposite corner and longitudinally opposite corner of the chassis. In this embodiment of the invention, these two corners of the chassis are diagonally opposite each other, neither corner being the corner nearest the wheel in question. Thus, the left front wheel 10 is connected at or near the right front and the left rear corners of the chassis by lateral spring 11 and longitudinal spring 12, respectively. Similar arrangements are provided for the remaining wheels. The consequence of this arrangement of the springs, in combination with the other elements and arrangements described below, is that a movement of any one wheel up or down, as a result of hitting bumps and depressions in the road, exerts a parallel and substantially equal vertical force on two diagonally opposite corners of the chassis. The movement of the wheel itself causes the chassis as a whole to rise or fall vertically, but the arrangement of the present invention prevents this movement (given an appropriate spring design, and symmetrical chassis loading) from exerting any tilting force on the chassis in any direction. In other words, despite the movement of the wheel relative to the chassis, the chassis itself remains approximately parallel to its original plane, and hence horizontally stable.

The spring supports at the wheels-end of each spring are so arranged that, regardless of the motion of the wheel itself from road shocks, these wheel-end supports are always maintained in a vertical plane which is perpendicular both laterally and longitudinally to the plane occupied by the chassis before the bump or depression was encountered. The spring supports are also prevented from rotating relative to the plane of the chassis or the axle of the adjacent wheel. The arrangements and devices by which these results are obtained differ, however, as between the front pair and the rear pair of wheels.

Figure 2:
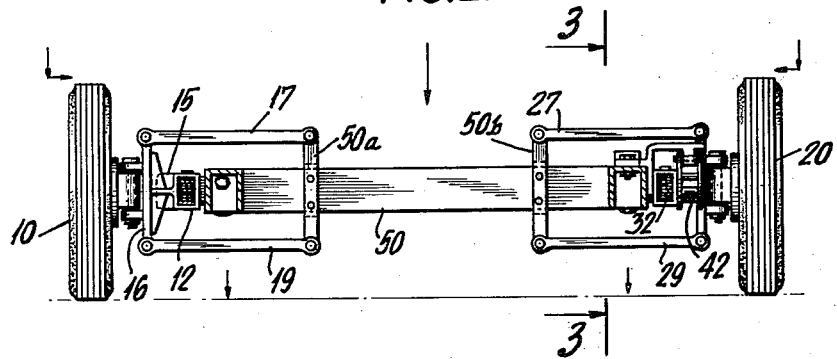
FIGURE 2 is a cross-sectional elevation taken along the line 2—2 of FIGURE 1.
Figure 3:
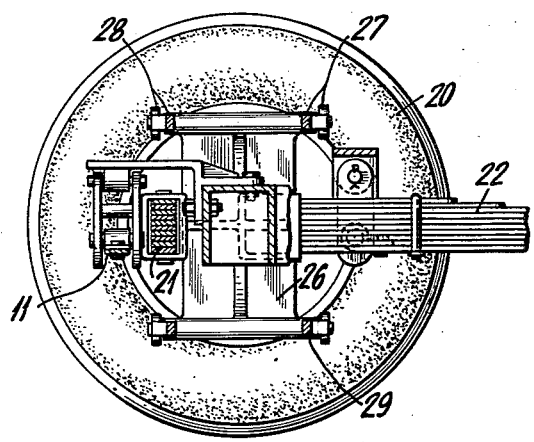
FIGURE 3 is a cross-sectional elevation taken along the line 3—3 of FIGURE 2.

For each of the two front wheels, the results described are achieved by connecting the wheel spring supports 15 and 25 to the chassis by parallelogram linkages. More specifically, as best shown in FIGURE 1, the wheel spring support 15 which carries the left front wheel 10 is connected to the chassis by a parallelogram linkage which includes a pair of upper links 17 and 18, a pair of lower links 19 (see FIGURE 2), one parallel to each of the links 17 and 18, a vertically disposed plate 16 carried by the wheel spring support 15 and pivotally connected to the outer ends of the links 17, 18 and 19, and a pair of vertically disposed members 50a which are affixed to the chassis and to which the inner ends of the links 17, 18 and 19 are pivotally connected. A similar arrangement exists with regard to the right front wheel 20, the parallelogram linkage including a pair of upper links 27 and 28, a pair of lower links 29, a vertically disposed plate 26 and a pair of vertically disposed members 50b. By virtue of these linkage arrangements, the front wheels 10 and 20 are connected to the respective corners of the chassis in a manner which will not impart angular orientation to the chassis, while permitting only vertical translation to be imparted to the chassis through the springs as described above.

Figure 4:
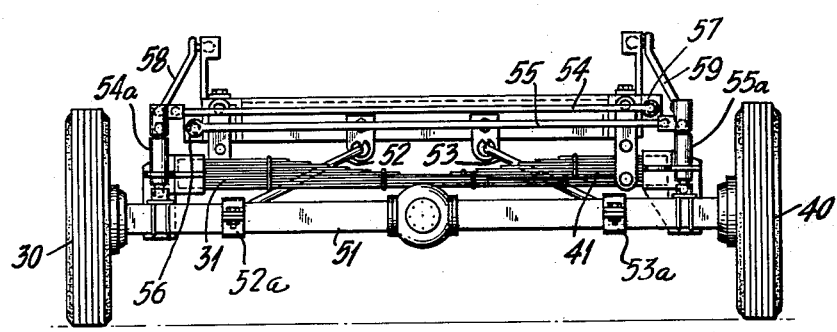
FIGURE 4 is a rear elevation taken on the line 4—4 of FIGURE 1.

In the spring suspension system of the present invention, the rear axle housing 51 is connected to the chassis by two converging torque rods 52 and 53. The forward converging ends of the torque rods 52 and 53 are connected through ball-and-socket joints to a crossbar of the chassis and the rear diverging ends of the torque bars are connected by ball-and-socket joints to anchorages 52a and 53a, respectively, carried by the rear axle housing 51. The ball-and-socket connections of the torque rods 52 and 53 provide the desired freedom of motion of the rear axle while, nevertheless, preventing the axle from moving laterally relative to the chassis. Above the rear axle housing 51 are so-called spring support bars 54a and 55a (shown in FIGURE 4) with ball-and-socket joints at both ends which hold rigidly the wheel spring supports 35 and 45, repsectively, and which connect these wheel spring supports to the chassis 50. A lateral radius rod 54 and a longitudinal radius rod 58 with ball-and-socket joints at both ends are each connected at one end to the ball-and-socket joint at the top of spring support bar 54a and at the other end to the chassis, the rod 58 extending forwardly of the rear of the chassis and the rod 54 extending transversely to the chassis extension 57. Likewise, a lateral radius rod 55 and a longitudinal radius rod 59 with ball-and-socket joints at both ends are each connected at one end to the ball-and-socket joint at the top of spring support bar 55a and at the other end to the chassis, the rod 59 extending transversely to the chassis extension 56. Consequently, any vertical movement imparted to wheel 30 or 40 by a bump or a depression is transmitted directly to the chassis ends of the springs 31 and 32 or 41 and 42, respectively, running to that wheel. None of the vertical force is expended in tilting or rotating the wheel-end spring supports to which the springs themselves are rigidly attached.

The springs running to any one wheel are rigidly attached at their wheel ends. They are attached in the case of each front wheel to the wheel plate and in the case of each rear wheel to the spring support bar. In all cases, however, the connections of the springs to the chassis are movable connections. As a result of said arrangement an upward vertical movement of the wheel end of any spring exerts an equal vertical force on the chassis at the point where the spring is connected, but without tilting the chassis away from the wheel end of the spring and without moving the chassis away from the wheel in the direction of the long axis of the spring. The pivotal connection of the spring to the chassis thus prevents the transmission of any tilting force to the chassis, and also prevents any lateral or longitudinal displacement of the chassis relative to the wheel.

The special arrangement of the above-mentioned elements not only contributes to keeping the chassis in a The special arrangement of the above-mentioned elements not only contributes to keeping the chassis in a substantially horizontal plane despite bumps and depressions in the road, as already shown, but also performs another major function. It provides means to prevent virtually all side-sway, sideways tilting and skidding when the vehicle meets curves at normal speeds. In consequence of the positions relative to each other of the above-described elements, the sideways thrust of the chassis induced on entering a curve is transmitted directly and in a virtually horizontal straight line to the centers of all four wheels, with a maximum lateral displacement of the chassis relative to the wheels of about ½ inch or less, and with no tilting of the chassis. Moreover, since the distribution of the vehicle load on the wheels thus remains virtually unchanged, all four wheels retain full contact with the road, and each has virtually the same load as it had before entering the curve. The net result is a great reduction in the danger of skids, and of rolling over, on curves.

The advantages of the present suspension system over conventional types of arrangement are quite significant, both in terms of passenger comfort (and for trucks the protection of the load) and, more importantly, in terms of safety. Assuming that the center of gravity of the chassis plus its lead is reasonably near the center of support of the chassis itself (the latter being at the intersection of the two imaginary lines between the diagonally opposite pairs of chassis spring supports, by which the springs are attached to the chassis) and assuming that the vehicle load is symmetrically distributed, the chief advantages for passenger cars are:

(a) Elimination of all force-and-aft pitching, lateral tilting and corkscrewing, caused by hitting bumps and depressions in the road. As already stated, the chassis as a whole maintains a substantially horizontal plane when the wheels hit bumps or depressions, and undergoes only relatively mild vertical movements up or down.

(b) Substantial reduction of vertical movement of chassis, when a wheel hits bumps and depressions, as compared with conventional designs. The movement is much less because, for example, as the rise of the wheel raises the chassis as a whole in a horizontal plane, the load on all other springs and wheels is reduced. This increases still more the load on the springs of the rising wheel, makes them bend still farther, and reduces the distance the chassis must rise in reaction to the bump.

(c) Elimination of virtually all side-sway and outward tilting when the vehicle meets curves, at normal speeds. Assume the road curves sharply to the left. Because of centrifugal force, in the conventional spring arrangement the whole chassis will sway to the right relative to the position of the wheels and of the road, and will also tilt to the right. In the new spring arrangement proposed here, however, it is impossible for either of these highly undesirable effects to appear to any appreciable degree. The rightward tendency of the chassis is transmitted directly to the right front and right rear wheels through the two sets of right front and right rear lateral springs, that run from the chassis to those wheels; but these lateral springs are themselves attached to the chassis at or near the left front and left rear corners of the chassis, respectively and are attached with only a small allowance (about ½ inch) for lateral play, thus preventing any appreciable sidesway. Further, they are attached to the chassis at approximately the same average distance from the ground as the distance from the centers of the right wheels themselves to the ground. Hence, the rightward lateral thrust of the chassis relative to the wheels, which results from entering the curve is exerted in a horizontal plane, thus preventing any lateral tilting of the chassis relative to the wheels. Moreover, the resulting lateral thrust on the right wheels at their points of contact with the ground is also almost horizontal. If the center of gravity of the chassis is at its center of support, this thrust differs from a true horizontal thrust only in the ratio of the height of the wheel spring supports from the ground to the horizontal distance from the center of the wheel to the center of the relevant lateral chassis spring supports, or about 1:4. This prevents any tilting of the right wheels and the chassis taken together in consequence of entering curves, except at very high speeds around very sharp curves.

(d) A very great increase in safety. (I) Rolling over. Because all appreciable tilting of chassis or wheels on curves is eliminated, except at very high speeds on sharp curves, the danger of rolling over on curves is also eliminated, with the same exception. (II) Skidding on curves. The virtual elimination of tilting on curves under reasonable conditions also has the result that all four wheels retain full contact with the ground on curves, and, also, retain the same share of the total weight of the car which they had before meeting the curve. This greatly reduces the danger of skids. (III) Loss of control of the car. Both the elimination of tilting and the great reduction in skidding (except at high speeds on sharp curves), and also the elimination of jolts and of fore-and-aft pitching and sideways rolling produced by hitting bumps and depressions in the road, protect the driver almost completely from the danger of losing control of the vehicle as a result of sudden and unexpected movements of the chassis itself relative to the road.

The center of gravity of trucks when loaded is necessarily much higher than that of passenger cars. Hence, the safety on curves which the present suspension system will provide for trucks is less than that for passenger vehicles, but all the other advantages of the proposed new system can be secured in full.

While the foregoing specification describes one embodiment of the invention wherein road shock forces are transmitted to two diagonally opposite corners of the chassis, neither of which is the corner receiving the shock force, it is also contemplated that one of the two diagonally opposite corners of the chassis may be the one receiving the road shock force. It is also to be understood, of course, that rolling or sliding connections may be used in lieu of the pivotal links described herein.

I claim:

1. A suspension system comprising a chassis, at least four wheels for supporting the chassis, a laterally extending spring connecting each wheel with the corner of the chassis on the other side of the vehicle at the same end, and a longitudinally extending spring connecting each wheel with the corner of the chassis at the opposite end of the vehicle on the same side, whereby diagonally opposite corners of the chassis are supported through springs by each wheel.

2. A suspension system as set forth in claim 1 including mechanical linkage means connecting each front wheel with the chassis to permit vertical movement of the wheel relative to the chassis without angular orientation of the wheel relative to the chassis.

3. A suspension system as set forth in claim 1 including symmetrical angularly disposed mechanical linkage means connecting each rear wheel with the chassis forward of the rear end of the chassis permitting one rear wheel to move vertically relative to the other but preventing lateral displacement of both rear wheels.

4. A suspension system as set forth in claim 1 including a connection movable in a fore-and-aft direction connecting each longitudinally extending spring with the chassis and a connection movable in a side-to-side direction connecting each laterally extending spring to the chassis.

5. A suspension system as set forth in claim 1 including a wheel spring support for each of the front wheels and converging radius rods pivoted at both ends and connecting the wheel spring support and the chassis, said radius rods permitting vertical displacement of the wheel and the wheel spring support relative to the ground without fore-and-aft movement or angular orientation.

6. A suspension system as set forth in claim 1 including a vertically extending element pivotally connected at its lower end to each rear wheel and rigidly holding the wheel spring support for each wheel, and a pair of pivotal rigid rods connecting the upper end of each said vertically extending element with the chassis, said rods permitting vertical displacement of said wheel spring support relative to the ground without fore-and-aft movement or angular orientation.

7. A suspension system as set forth in claim 1 including a wheel spring support associated with each wheel, means rigidly connecting the longitudinally and laterally extending springs to the respective wheel spring support, and means pivotally connecting each spring at its opposite end to the chassis.

8. A suspension system comprising a chassis, wheels attached thereto, a laterally extending spring and a longitudinally extending spring connecting each wheel to diagonally opposite corners of the chassis, a rear axle housing, anchorages at each end of the axle housing, at least two pivotal rigid rods connecting each of said anchorages with the chassis, and at least two symmetrically arranged rigid rods connecting the rear axle housing with a part of the chassis forward of the rear end of the chassis.

9. A suspension system for a vehicle comprising a chassis, a rear axle housing, a pair of rear driven wheels, one at each end of the rear axle housing, resilient connections between both ends of the rear axle housing and the chassis, an upstanding element pivoted to the rear axle housing at each end thereof, a symmetrical arrangement of fore-and-aft converging radius rods, at least one on each side of the centerline of the vehicle, connecting the rear axle housing to the chassis forward of the rear end thereof to permit one rear wheel to move vertically relative to the other when coming into contact with a bump or hole in the ground, but preventing lateral displacement of the rear axle housing, and fore-and-aft and transversely extending radius rods connecting each of the upstanding elements with the chassis.

References Cited in the file of this patent
UNITED STATES PATENTS

| 1,020,636 | Charter | Mar. 19, 1912 |
| 1,993,080 | Wolff | Mar. 5, 1935 |
| 2,299,241 | Kumm | Oct. 20, 1942 |
| 2,309,811 | Utz | Feb. 2, 1943 |